(12) United States Patent
Leslie et al.

(10) Patent No.: US 10,100,670 B2
(45) Date of Patent: Oct. 16, 2018

(54) HEATSHIELD ASSEMBLY WITH DOUBLE LAP JOINT FOR A GAS TURBINE ENGINE

(71) Applicant: United Technologies Corporation, Hartford, CT (US)

(72) Inventors: Nicholas R. Leslie, South Berwick, ME (US); Neil L. Tatman, Brentwood, NH (US)

(73) Assignee: United Technologies Corporation, Farmington, CT (US)

( * ) Notice: Subject to any disclaimer, the term of this patent is extended or adjusted under 35 U.S.C. 154(b) by 331 days.

(21) Appl. No.: 14/893,801

(22) PCT Filed: Jun. 12, 2014

(86) PCT No.: PCT/US2014/042121
§ 371 (c)(1),
(2) Date: Nov. 24, 2015

(87) PCT Pub. No.: WO2014/201247
PCT Pub. Date: Dec. 18, 2014

(65) Prior Publication Data
US 2016/0123187 A1    May 5, 2016

Related U.S. Application Data

(60) Provisional application No. 61/835,201, filed on Jun. 14, 2013.

(51) Int. Cl.
| | | |
|---|---|---|
| F01D 25/14 | (2006.01) | |
| F01D 25/26 | (2006.01) | |
| F01D 25/08 | (2006.01) | |
| F01D 11/08 | (2006.01) | |

(52) U.S. Cl.
CPC ............ *F01D 25/145* (2013.01); *F01D 11/08* (2013.01); *F01D 25/08* (2013.01); *F01D 25/26* (2013.01); *F05D 2220/32* (2013.01); *F05D 2240/15* (2013.01); *F05D 2260/231* (2013.01); *Y02T 50/675* (2013.01)

(58) Field of Classification Search
CPC ........ F01D 25/145; F01D 11/08; F01D 25/08; F01D 25/26; F05D 2240/15
See application file for complete search history.

(56) References Cited

U.S. PATENT DOCUMENTS

| | | |
|---|---|---|
| 4,611,464 A | 9/1986 | Hetzer et al. |
| 4,685,286 A | 8/1987 | Hetzer et al. |
| 4,921,401 A * | 5/1990 | Hall .......................... F01D 9/04 403/28 |
| 5,706,651 A | 1/1998 | Lillibridge et al. |
| 5,791,138 A | 8/1998 | Lilllibridge et al. |
| 5,943,856 A | 8/1999 | Lillibridge et al. |

(Continued)

OTHER PUBLICATIONS

Extended EP Search Report for EP Appln. No. 14811460.6 dated Jul. 1, 2016.

*Primary Examiner* — Logan Kraft
*Assistant Examiner* — Peter T Hrubiec
(74) *Attorney, Agent, or Firm* — O'Shea Getz P.C.

(57) ABSTRACT

A heat shield assembly for a gas turbine engine includes a first heat shield segment defined about an axis and a second heat shield segment defined about the axis. A double circumferential lap joint is defined between the first heat shield segment and the second heat shield segment.

15 Claims, 15 Drawing Sheets

(56) References Cited

U.S. PATENT DOCUMENTS

| | | |
|---|---|---|
| 5,972,524 A | 10/1999 | Childress |
| 6,944,580 B1 | 9/2005 | Blume et al. |
| 7,100,358 B2 | 9/2006 | Gekht et al. |
| 7,266,941 B2 | 9/2007 | Eleftheriou et al. |
| 7,370,467 B2 | 5/2008 | Eleftheriou et al. |
| 7,565,796 B2 | 7/2009 | Eleftheriou et al. |
| 7,739,866 B2 | 6/2010 | Eleftheriou et al. |
| 7,765,787 B2 | 8/2010 | Eleftheriou et al. |
| 7,770,378 B2 | 8/2010 | Eleftheriou et al. |
| 7,793,488 B2 | 9/2010 | Eleftheriou et al. |
| 7,797,922 B2 | 9/2010 | Eleftheriou et al. |
| 2005/0091984 A1 | 5/2005 | Czachor |
| 2006/0193721 A1 | 8/2006 | Adam et al. |
| 2008/0072599 A1 | 3/2008 | Morenko et al. |
| 2008/0078080 A1 | 4/2008 | Patel et al. |
| 2012/0047905 A1 | 3/2012 | Rauch et al. |

* cited by examiner

HEATSHIELD ASSEMBLY WITH DOUBLE LAP JOINT FOR A GAS TURBINE ENGINE

CROSS-REFERENCE TO RELATED APPLICATION

This application claims priority to PCT patent application No. PCT/US14/42121 filed Jun. 12, 2014, which claims priority to U.S. Patent Appln. No. 61/835,201 filed Jun. 14, 2013.

BACKGROUND

The present disclosure relates to a gas turbine engine and, more particularly, to a bleed air cavity heat shield arrangement for a gas turbine engine.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

Heat shields are used in various engine sections such as within the compressor section to isolate Outer Air Seal (OAS) and case flanges to control thermal response. This facilitates control of rotor blade tip clearances with respect to a rub strip of the OAS. Tighter tip clearance improves engine efficiency and performance.

The heat shields generally span the entire circumference of each or a multiple of engine stages and are usually split into multiple, typically about one-hundred eighty (180) degree segments. A gap between the heat shield segments facilitates engine assembly and accommodates circumferential thermal growth. The size of this gap is generally determined by the relationship between the thermal growth of the heat shield segments and the OAS/case flanges at each bolt location. The gap is sized such that even under maximum tolerance and thermal effects, the heat shield segment ends do not touch. Bleed air leakage through the circumferential thermal expansion gap, however, need also to be limited to isolate the flanges from bleed cavity air. To minimize the bleed air leakage, a cover plate spans the circumferential thermal expansion gap to form a single lap joint.

To accommodate axial thermal growth and tolerances, heat shield retainers provide either a relatively loose or a relatively tight heat shield axial interface. In a relatively loose configuration, the relatively loose interface may result in vibration which may cause wear on adjacent components such as the OAS and case flanges. In a relatively tight configuration, the relatively tight interface may result in deformation that yields the heat shield segments. The cover plates also may lift during assembly due to the deformation such that sealing benefits of the covers are reduced.

SUMMARY

A heat shield assembly is provided for a gas turbine engine according to one disclosed non-limiting embodiment of the present disclosure. This heat shield assembly includes a first heat shield segment defined about an axis. The heat shield assembly also includes a second heat shield segment defined about the axis and a double circumferential lap joint between the first heat shield segment and the second heat shield segment.

In a further embodiment of the present disclosure, the double circumferential lap joint may be defined by an outer cover and an alignment tab mounted to the first heat shield segment. The outer cover and the alignment tab may extend beyond an edge of the first heat shield segment.

In a further embodiment of any of the foregoing embodiments of the present disclosure, the outer cover and the alignment tab may form an interference fit with the second heat shield segment.

In a further embodiment of any of the foregoing embodiments of the present disclosure, the outer cover may include a radiused end.

In a further embodiment of any of the foregoing embodiments of the present disclosure, the alignment tab may be a plate.

In a further embodiment of any of the foregoing embodiments of the present disclosure, the alignment tab may include a curved end which curves away from the outer cover.

In a further embodiment of any of the foregoing embodiments of the present disclosure, the outer cover may be generally L-shaped in cross-section.

In a further embodiment of any of the foregoing embodiments of the present disclosure, the outer cover may include an axial end radially displaced from the first heat shield segment.

In a further embodiment of any of the foregoing embodiments of the present disclosure, the axial end may include a curved end that curves away from the first heat shield segment.

In a further embodiment of any of the foregoing embodiments of the present disclosure, the outer cover may be generally serpentine shaped.

A case assembly is provided for a gas turbine engine according to another disclosed non-limiting embodiment of the present disclosure. This case assembly includes an outer air seal flange interface defined about an engine axis; a first heat shield segment defined about the axis radially outboard of the outer air seal; a second heat shield segment defined about the axis radially outboard of the outer air seal; a double circumferential lap joint between the first heat shield segment and the second heat shield segment; and a fastener mounted to the outer air seal flange interface and the first heat shield segment.

In a further embodiment of any of the foregoing embodiments of the present disclosure, the double circumferential lap joint may be defined by an outer cover and an alignment tab mounted to the first heat shield segment. The outer cover and the alignment tab may extend beyond an edge of the first heat shield segment.

In a further embodiment of any of the foregoing embodiments of the present disclosure, a flange may extend from the outer air seal. The flange may be sandwiched between the first heat shield segment, the second heat shield segment and the outer cover.

In a further embodiment of any of the foregoing embodiments of the present disclosure, the first heat shield segment, the second heat shield segment and the outer cover may define an interference fit with the flange to generate a pinching preload.

In a further embodiment of any of the foregoing embodiments of the present disclosure, a heat shield retainer assembly with a heat shield flange may be included. The heat shield flange may be sandwiched between the first heat shield segment, the second heat shield segment and the outer cover.

In a further embodiment of any of the foregoing embodiments of the present disclosure, the heat shield retainer assembly may be mounted to a second outer air seal flange interface. The first heat shield segment, the second heat shield segment and the heat shield retainer assembly may surround the outer air seal flange and the second outer air seal.

In a further embodiment of any of the foregoing embodiments of the present disclosure, the heat shield retainer assembly may be mounted to a second outer air seal flange interface. The first heat shield segment, the second heat shield segment and the heat shield retainer assembly may bridge the outer air seal flange interface and the second outer air seal flange interface.

In a further embodiment of any of the foregoing embodiments of the present disclosure, the first heat shield segment, the second heat shield segment and the outer cover may define an interference fit with the heat shield flange.

A method of mounting a heat shield assembly within a bleed air cavity of a gas turbine engine is provided according to another disclosed non-limiting embodiment of the present disclosure. This method includes surrounding an outer air seal flange interface with a first heat shield segment and a second heat shield segment, and interfacing the first heat shield segment and the second heat shield segment at a double circumferential lap joint to provide a sliding seal.

In a further embodiment of any of the foregoing embodiments of the present disclosure, the method may include defining a circumferential thermal expansion gap between the first heat shield segment and the second heat shield segment. The method may also include bridging the circumferential thermal expansion gap with the double circumferential lap joint.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
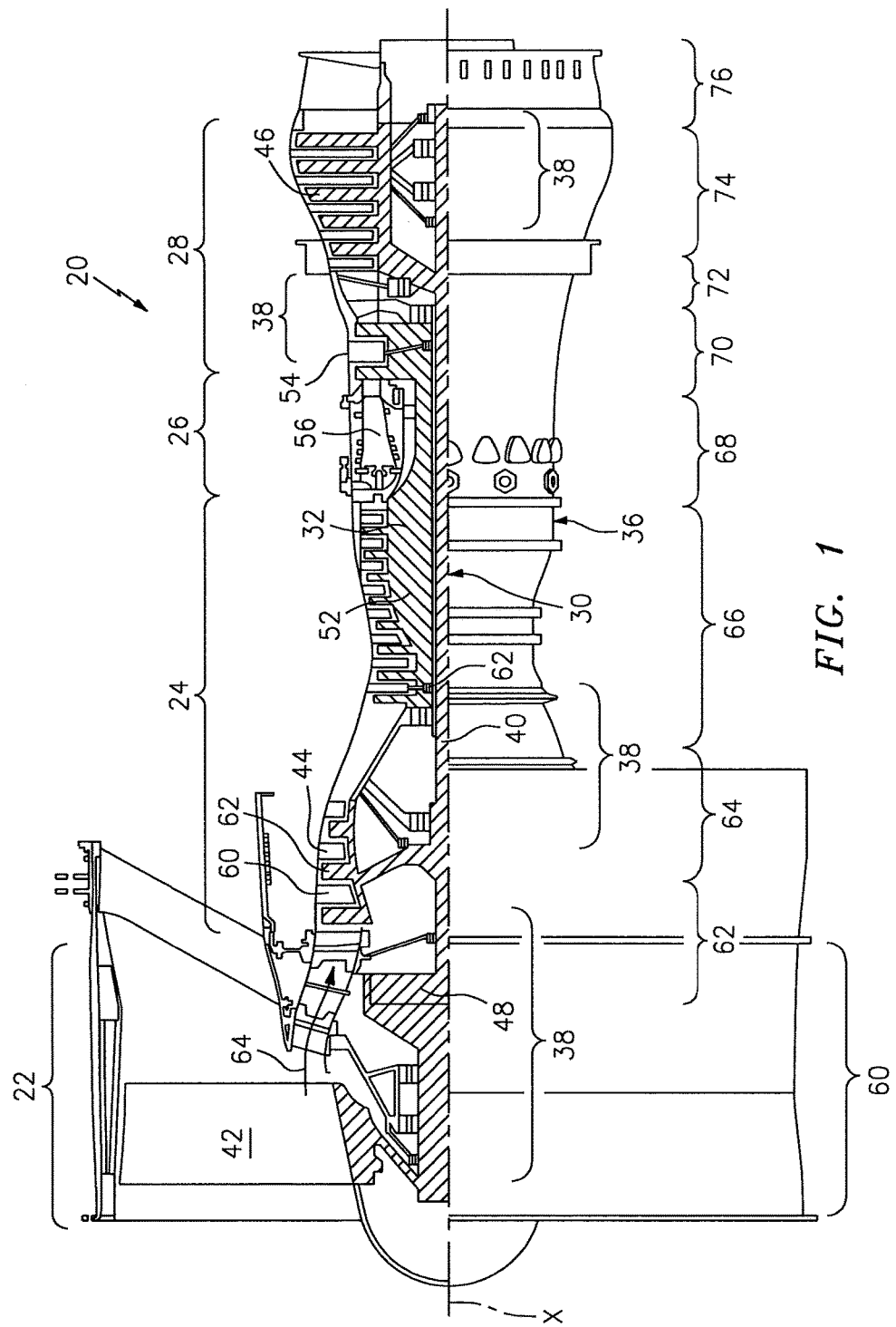
FIG. 1 is a schematic cross-sectional view of a geared architecture gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines architectures such as a low-bypass turbofan may also include an augmentor section (not shown) among other systems or features. Although schematically illustrated as a turbofan in the disclosed non-limiting embodiment, it should be understood that the concepts described herein are not limited to use with turbofans as the teachings may be applied to other types of turbine engines to include but not limited to a three-spool (plus fan) engine wherein an intermediate spool includes an intermediate pressure compressor (IPC) between a low pressure compressor (LPC) and a high pressure compressor (HPC) with an intermediate pressure turbine (IPT) between a high pressure turbine (HPT) and a low pressure turbine (LPT) as well as other engine architectures such as turbojets, turboshafts, open rotors and industrial gas turbines.

The fan section 22 drives air along a bypass flowpath and a core flowpath while the compressor section 24 drives air along the core flowpath for compression and communication into the combustor section 26 then expansion through the turbine section 28. The engine 20 generally includes a low spool 30 and a high spool 32 mounted for rotation about an engine central longitudinal axis A relative to an engine case assembly 36 via several bearing structures 38.

The low spool 30 generally includes an inner shaft 40 that interconnects a fan 42, a low-pressure compressor ("LPC") 44 and a low-pressure turbine ("LPT") 46. The inner shaft 40 drives the fan 42 through a geared architecture 48 to drive the fan 42 at a lower speed than the low spool 30. The high spool 32 includes an outer shaft 50 that interconnects a high-pressure compressor ("HPC") 52 and a high-pressure turbine ("HPT") 54. A combustor 56 is arranged between the HPC 52 and the HPT 54. The inner shaft 40 and the outer shaft 50 are concentric and rotate about the engine central longitudinal axis A that is collinear with their longitudinal axes.

Core airflow is compressed by the LPC 44 then the HPC 52, mixed with the fuel and burned in the combustor 56, then expanded over the HPT 54 and the LPT 46. The HPT 54 and the LPT 46 drive the respective low spool 30 and high spool 32 in response to the expansion.

In one example, the gas turbine engine 20 is a high-bypass geared architecture engine in which the bypass ratio is greater than about six (6:1). The geared architecture 48 can include an epicyclic gear system 48, such as a planetary gear system, star gear system or other system. The example epicyclic gear system has a gear reduction ratio of greater than about 2.3, and in another example is greater than about 2.5 with a gear system efficiency greater than approximately 98%. The geared turbofan enables operation of the low spool 30 at higher speeds which can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be understood, however, that the above parameters are only exemplary of one embodiment of a geared architecture engine and that the present disclosure is applicable to other gas turbine engines including direct drive turbofans.

In one non-limiting embodiment, a significant amount of thrust is provided by the bypass flow due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of ("Tram"/518.7)$^{0.5}$. The Low Corrected Fan Tip Speed according to one non-limiting embodiment of the example gas turbine engine 20 is less than about 1150 fps (351 m/s).

The engine case assembly 36 generally includes a multiple of modules to include a fan case module 60, an intermediate case module 62, an LPC module 64, a HPC module 66, a diffuser module 68, a HPT module 70, a mid-turbine frame (MTF) module 72, a LPT module 74, and a Turbine Exhaust Case (TEC) module 76. It should be understood that additional or alternative modules might be utilized to form the engine case assembly 36.

Figure 2:
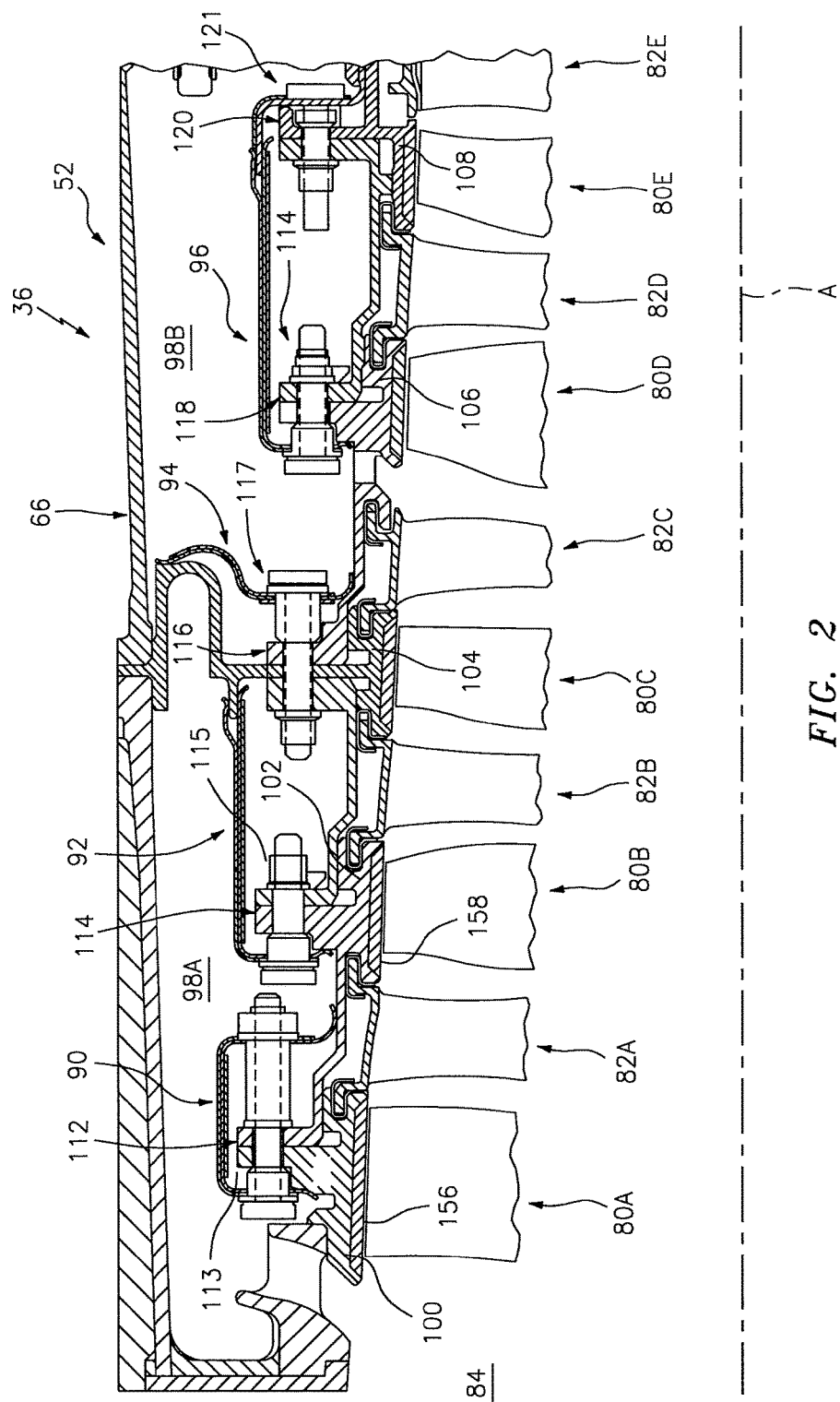
FIG. 2 is an expanded schematic view of a High Pressure Compressor Section of the gas turbine engine of FIG. 1.

With reference to FIG. 2, the HPC 52 includes a multiple of stages, e.g., 4th, 5th, 6th, 7th and 8th stages shown, with respective rotational rotor assemblies 80A-80E and stationary vane arrays 82A-82E along an airflow passage 84. Although the HPC 52 is illustrated in the disclosed non-limiting embodiment, other engine sections will also benefit herefrom. Moreover, although a particular number of stages are illustrated, it should be appreciated that any number of stages will benefit herefrom.

Within the engine case assembly 36 such as within the HPC module 66, a multiple of heat shield assemblies 90, 92, 94, 96 (e.g., respective 4th, 5th, 6th, 7th and 8th stage heat shield assemblies) are shown to define one or more annular bleed air cavities 98A, 98B within the engine case assembly 36. The heat shield assemblies 90, 92, 94, 96 thermally isolates the core flowpath 84 from bleed airflow to control the thermal response of the engine case assembly 36 with respect to the rotational rotor assemblies 82. This thereby facilitates relatively tighter rotor tip clearances to increase engine efficiency and performance.

Figure 3:
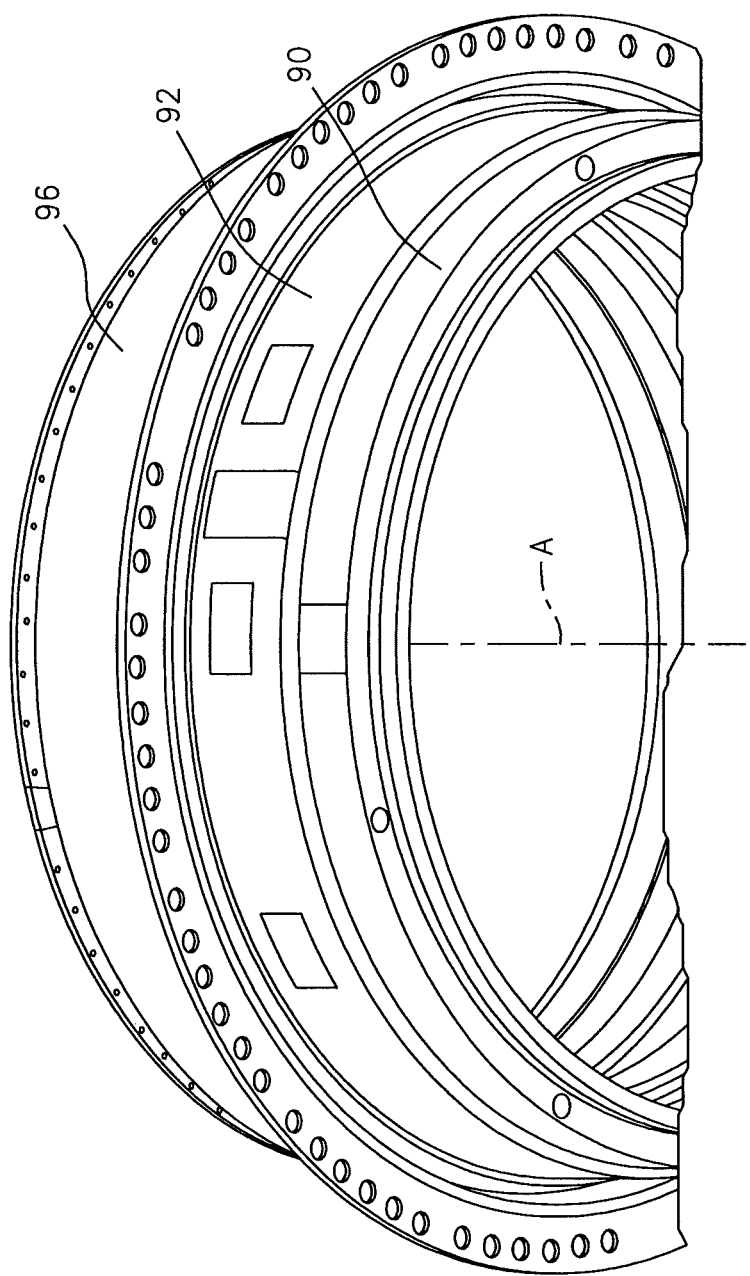
FIG. 3 is an expanded perspective front looking aft view of a heat shield assembly for the High Pressure Compressor Section according to one disclosed non-limiting embodiment.
Figure 4:
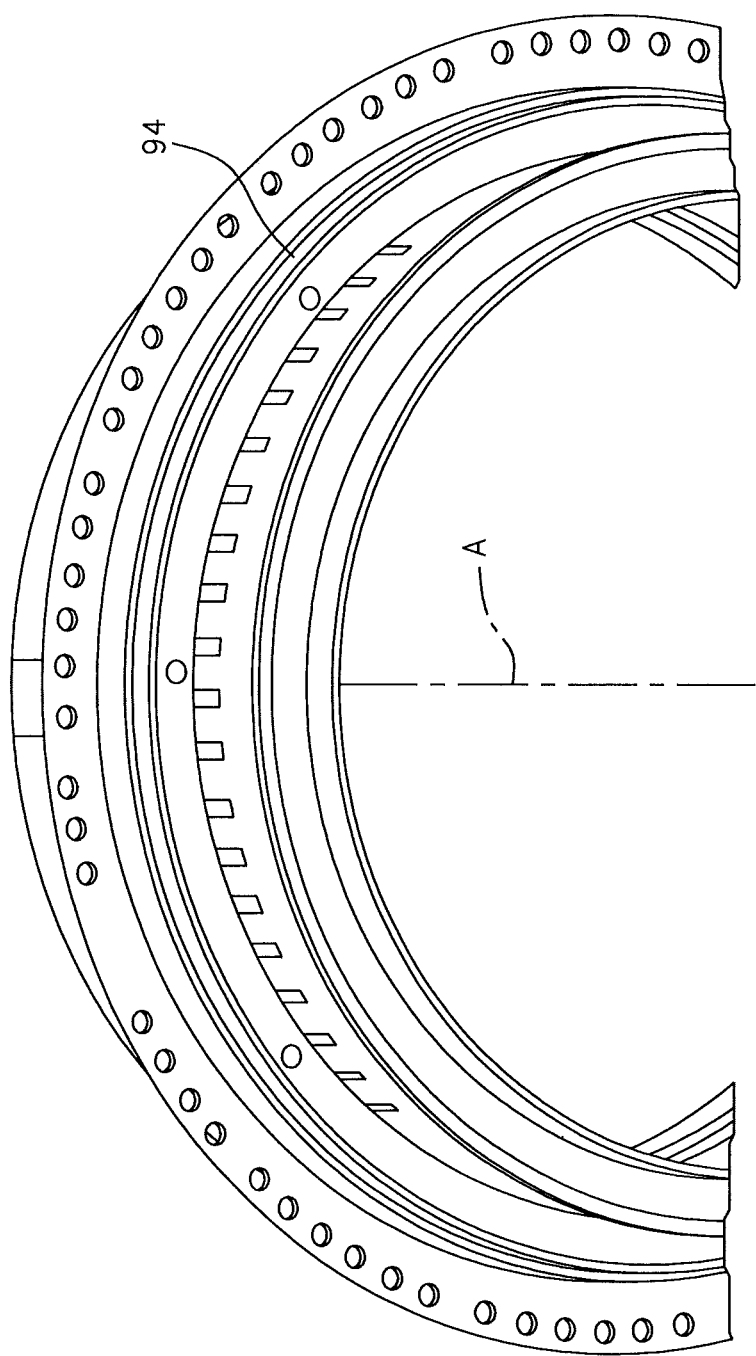
FIG. 4 is an expanded perspective aft looking forward view of a heat shield assembly for the High Pressure Compressor Section according to one disclosed non-limiting embodiment.

The heat shield assemblies 90, 92, 94, 96 generally span the entire circumference of a single stage or multiple stages (See FIGS. 3 and 4). The heat shield assemblies 90, 92, 94, 96 are usually split into multiple circumferential segments (e.g., two (2) near one hundred-eighty (180) degree segments) to facilitate assembly and permit circumferential thermal growth (see FIG. 5). A gap 98 defined between the respective heat shield segments permits the circumferential thermal growth. The size of this gap 98 may be determined by comparing the thermal growth of the respective heat shield assembly 90, 92, 94, 96 and the Outer Air Seal (OAS) 100, 102, 104, 106, 108 and an outer air seal flange interface 112, 114, 116, 118, 120 at respective bolt locations 113, 115, 117, 119, 121. The gap 98 may be sized such that with maximum case tolerances and thermal effects, the circumferential heat shield segment edges 110A, 110B do not come into contact. Since one purpose of the heat shield assemblies 90, 92, 94, 96 is to isolate the respective outer air seal flange interfaces 112, 114, 116, 118, 120 from the bleed air cavities 98A, 98B, bleed air leakage through the heat shield segments need be minimized.

Figure 5:
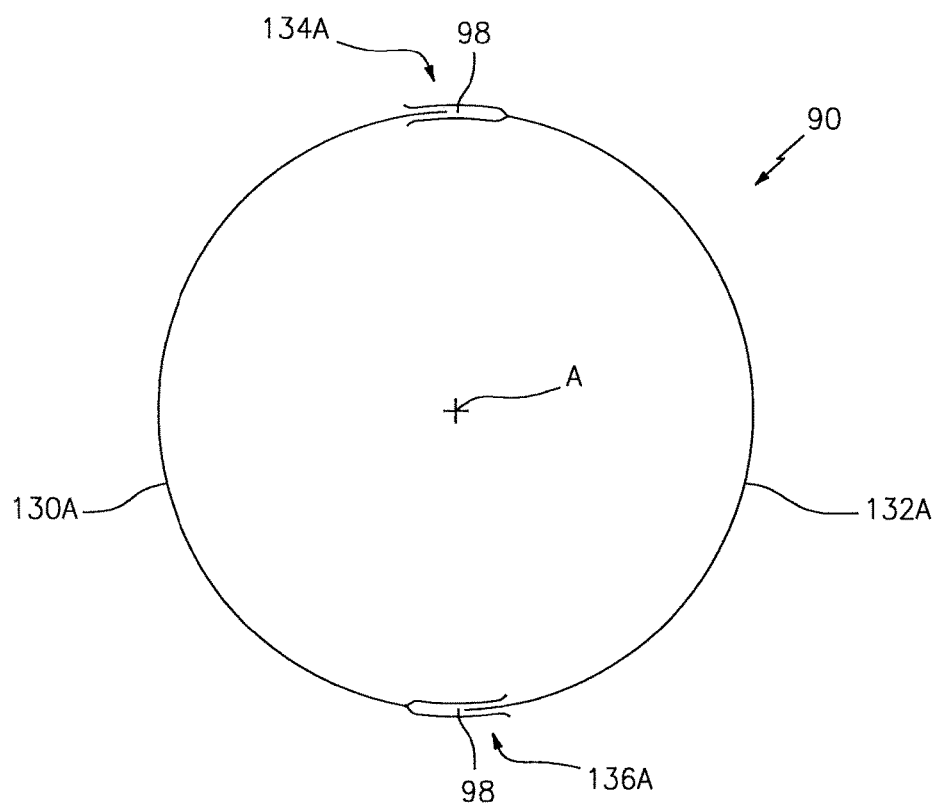
FIG. 5 is a schematic view of a multi-segment heat shield assembly.

The heat shield assembly 90 generally includes a first circumferential heat shield segment 130A, a second circumferential heat shield segment 132A, a first cover interface 134A and a second cover interface 136A (FIG. 5). It should be appreciated that the first circumferential heat shield segment 130A and the first cover interface 134A are generally equivalent to the second circumferential heat shield segment 132A and second cover interface 136A such that only the first circumferential heat shield segment 130A and the first cover interface 134A will be described in detail (see FIGS. 5 and 7).

Figure 6:
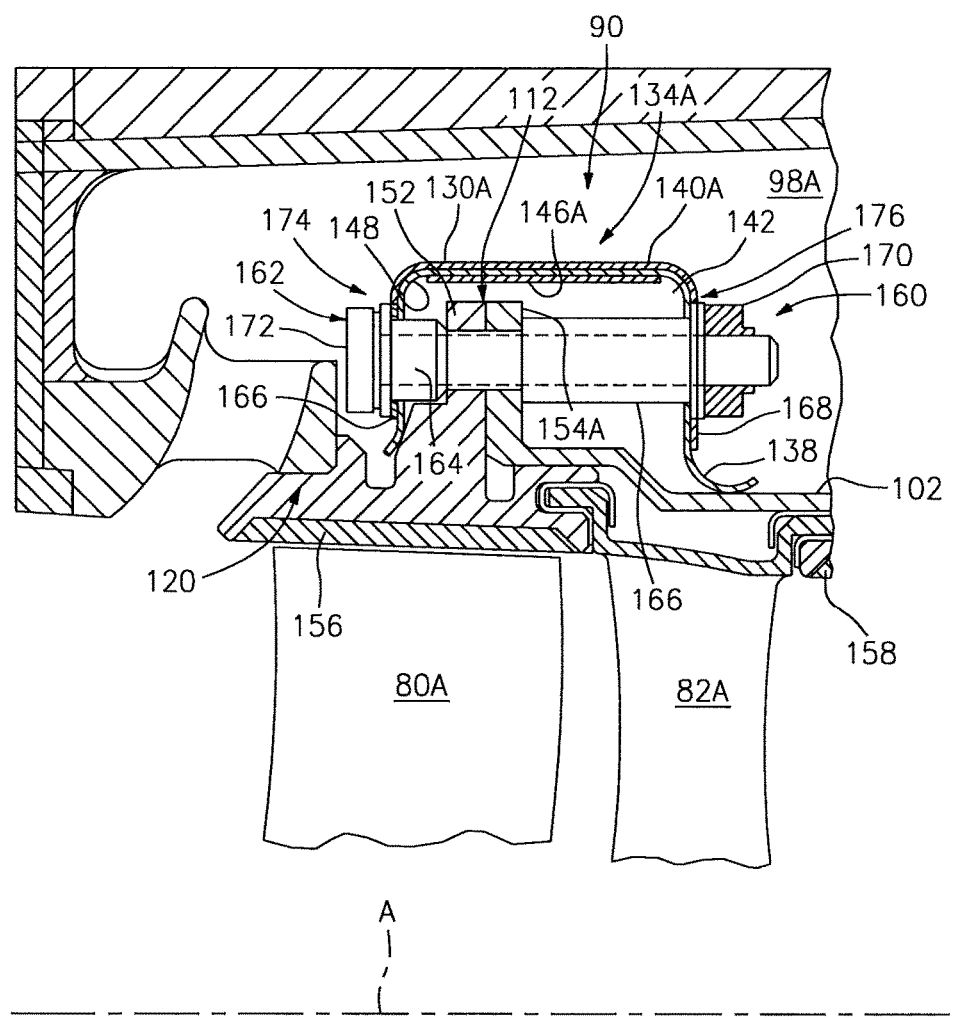
FIG. 6 is a schematic view of a multi-segment heat shield assembly for a $4^{th}$ stage of the High Pressure Compressor Section.

With reference to FIG. 6, the first circumferential heat shield segment 130A is generally U-shaped in cross-section with a radiused end 138. The first cover interface 134A generally includes an outer cover 140A attached thereto though, for example, by spot-welds W (shown schematically), line welds or fasteners to secure the outer cover 140A to an outer surface 142 of the first circumferential heat shield segment 130A. The outer cover 140A is "outer" with respect to the relatively higher pressure bleed air cavity 98A. That is, the relatively higher pressure bleed air cavity 98A presses inward on the outer cover 140A toward the first circumferential heat shield segment 130A.

The outer cover 140A is generally U-shaped in cross-section to axially and radially surround a portion of the outer surface 142 (best seen in FIG. 5). The outer cover 140A also extends circumferentially beyond an edge 110A of the first circumferential heat shield segment 130A to overlap the circumferential thermal expansion gap 98 between the first circumferential heat shield segment 130A and the second circumferential heat shield segment 132A (see FIG. 7).

An alignment tab 146A, in one disclosed non-limiting embodiment, is a generally flat member which is spot-welded or otherwise mounted to an inner surface 148 of the first circumferential heat shield segment 130A. The alignment tab 146A extends circumferentially for a distance generally equivalent to that of the outer cover 140A beyond the edge 110A of the first circumferential heat shield segment 130A and includes a curved end 150 which curves away from the outer cover 140A to facilitate receipt of the second circumferential heat shield segment 132A (see FIG. 7). That is, the outer cover 140A and the alignment tab 146A define a double circumferential lap joint 144A to receive the second circumferential heat shield segment 132A therein (see FIG. 7) and thereby accommodate the axial thermal growth and tolerances between the first and second circumferential heat shield segments 130A, 132A.

The double circumferential lap joint 144A may provide a clamping force preload at the sliding seal. The outer cover 140A and the alignment tab 146A may additionally include a wear coating to further accommodate the sliding seal between the first and the second circumferential heat shield segments 130A, 132A to minimize fretting.

With continued reference to FIG. 6, the heat shield assembly 90 is mounted around the outer air seal flange interface 112 between a $4^{th}$ stage OAS flange 152 and a $5^{th}$ stage OAS flange 154A of the respective OASs 100, 102. That is, the heat shield assembly 90 surrounds and seals the outer air seal flange interface 112 between, for example, the $4^{th}$ and $5^{th}$ stage OAS 100, 102 which support a respective rub strip 156, 158.

Figure 8:
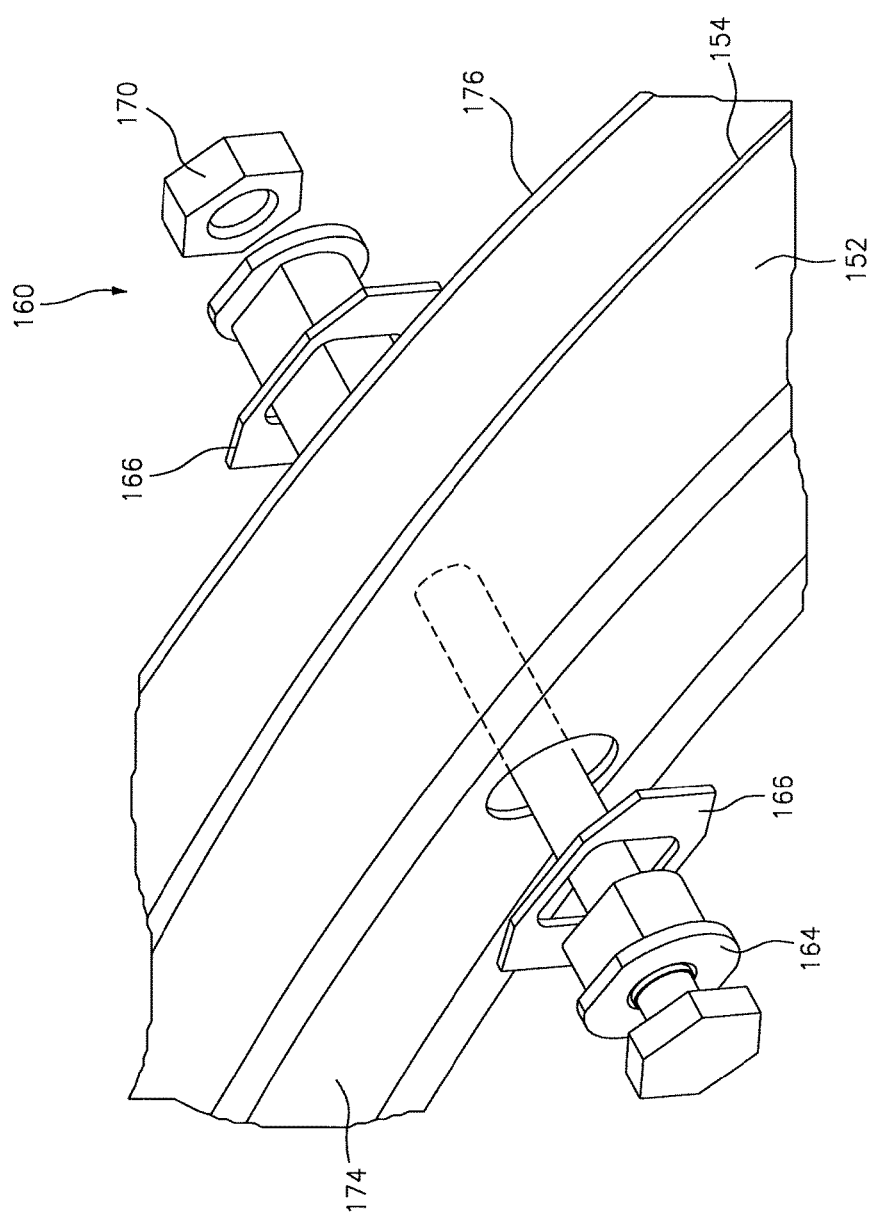
FIG. 8 is a partial phantom top perspective view of a portion of the multi-segment heat shield assembly for the $4^{th}$ stage of the High Pressure Compressor Section.

A multiple of fastener assemblies 160 (one shown in FIG. 6) retain the $4^{th}$ stage OAS flange 152 and the $5^{th}$ stage OAS flange 154A and mounts the heat shield assembly 90 therearound. Each fastener assembly 160 generally includes a hex bolt 162, a first spacer sleeve 164, a first spacer plate 166, a second spacer sleeve 166, a second spacer plate 168 and a nut 170. It should be appreciated that other fastener arrangements (also shown in FIG. 8) may alternatively or additionally be provided.

The first spacer sleeve 164 and the second spacer sleeve 166 operate to preload the $4^{th}$ stage OAS flange 152 and the $5^{th}$ stage OAS flange 154A between a head 172 of the bolt 162 and the nut 170 as well as prevent crushing of the heat shield assembly 90 which is supported thereby.

Figure 7:
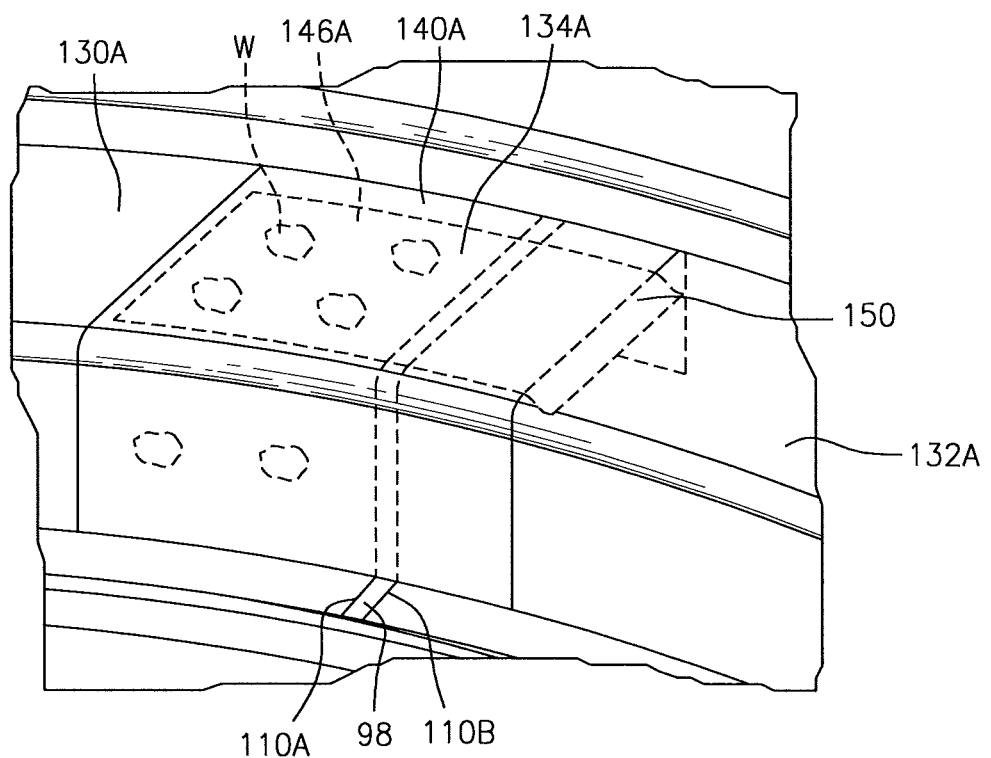
FIG. 7 is a perspective view of a portion of the multi-segment heat shield assembly for the $4^{th}$ stage of the High Pressure Compressor Section.

A first radial section 174 of the first and the second circumferential heat shield segment 130A, 132A are sandwiched between the $4^{th}$ stage OAS flange 152, the first spacer sleeve 164, the first spacer plate 166 and the head 172 of the bolt 162 (see FIG. 7). A second radial section 176 of the first and the second circumferential heat shield segment 130A, 132A (also shown in FIG. 7) are sandwiched between the $5^{th}$ stage OAS flange 154A, the second spacer sleeve 166, the second spacer plate 168 and the nut 170 (also shown in FIG. 7). The radiused end 138 provides a flexible radial interface seal with the $5^{th}$ stage OAS flange 154A. The multiple of fastener assemblies 160 thereby securely retain the first and the second circumferential heat shield segment 130A, 132A yet minimize deformation thereof.

Figure 9:
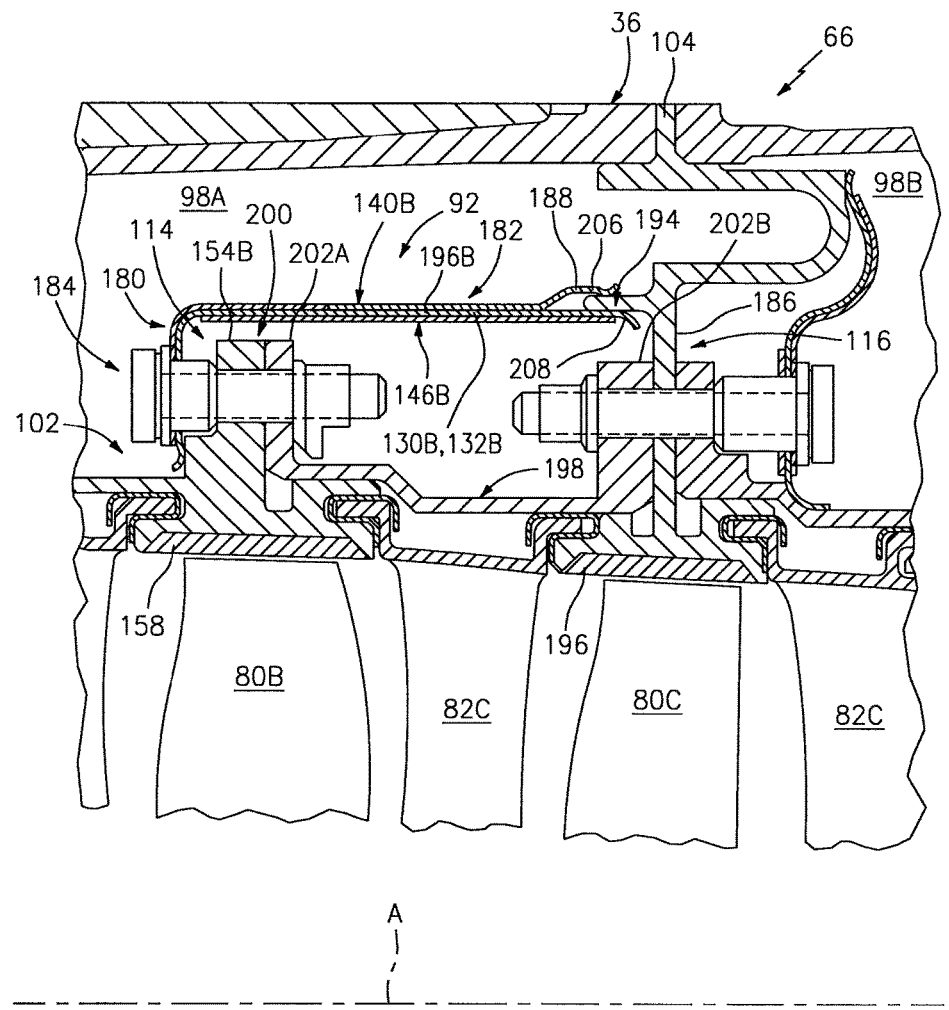
FIG. 9 is a schematic view of a multi-segment heat shield assembly for a $5^{th}$ stage of the High Pressure Compressor Section.
Figure 10:
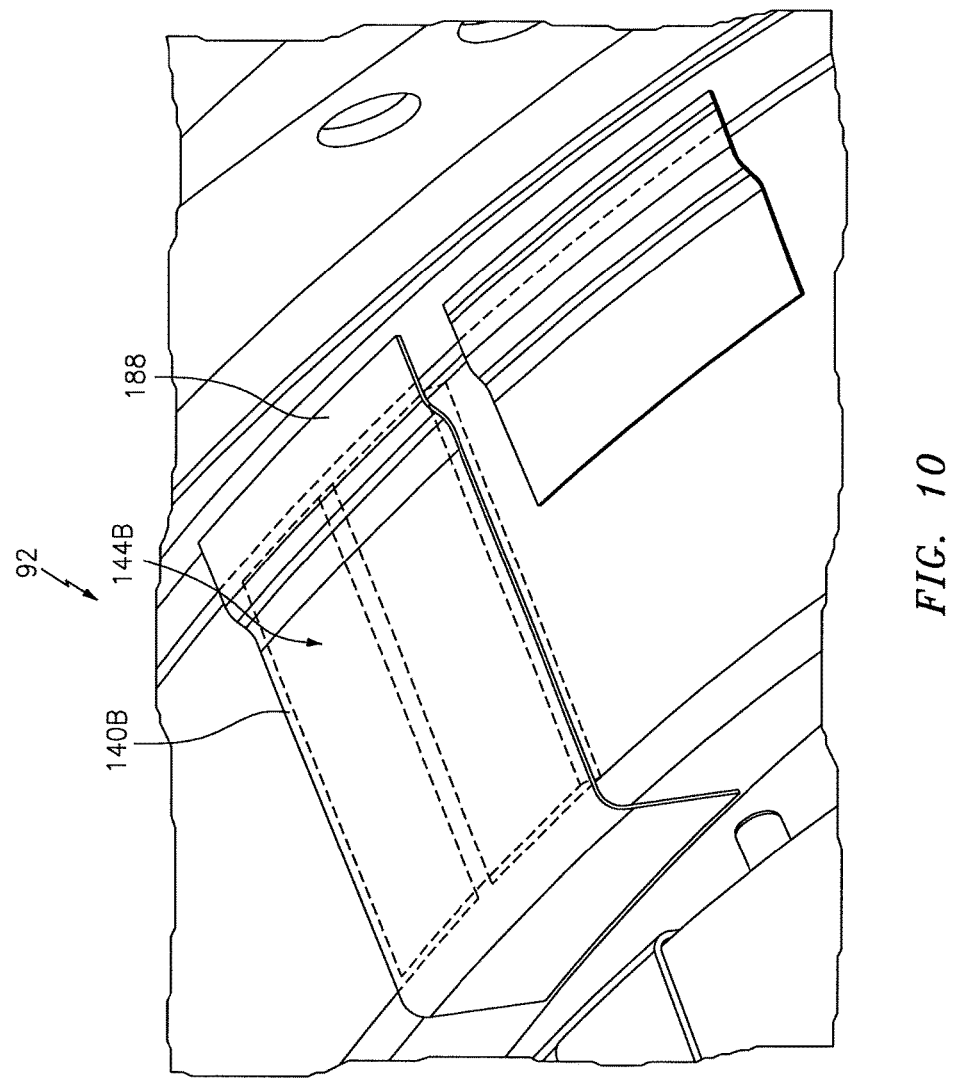
FIG. 10 is a perspective view of a portion of the multi-segment heat shield assembly for the $5^{th}$ stage of the High Pressure Compressor Section.

With reference to FIG. 9, the heat shield assembly 92 according to another disclosed non-limiting embodiment is generally L-shaped and includes a radial section 180 and an axial section 182. As afore-described, the heat shield assembly 92 is manufactured of multiple circumferential segments which are sealed by a double circumferential lap joint 144B (also shown in FIG. 10) with an outer cover plate 140B and an alignment tab 196B.

The radial section 180 is mounted to the $5^{th}$ stage OAS 102 with a multiple of fastener assemblies 184 (one shown) that retains the $5^{th}$ stage OAS 102 to the $6^{th}$ stage OAS 104 and mounts the heat shield assembly 92 therearound. It should be appreciated that various fastener assemblies may be utilized as afore-described.

The axial section 182 includes an outer cover plate 140B with an axial end 188 radially displaced from the heat shield segments 130B, 132B to interface with an axial flange 194 of a $6^{th}$ stage OAS flange 186. The axial end 188 and the heat shield segments 130B, 132B thereby form a double axial lap joint with the axial flange 194 to provide a pinching preload which axially slides along the axial flange 194 to reduce relative motion and minimize wear such as fretting.

The $6^{th}$ stage OAS flange 186 in this disclosed non-limiting embodiment extends radially between a rub strip 196 and the engine case assembly 36 of the HPC module 66. That is, the $6^{th}$ stage OAS flange 186 segregates the bleed air cavity 98A from the relatively higher-pressure bleed air cavity 98B.

The heat shield assembly 92 bridges an OAS spacer case 198 between a $5^{th}$ stage OAS flange 154B and the $6^{th}$ stage OAS flange 186 to thereby seal an outer air seal flange interface 200 between the $5^{th}$ stage OAS flange 154B and a first OAS flange 202A of the OAS spacer case 198 as well as a second OAS flange 202B of the OAS spacer case 198 and the $6^{th}$ stage OAS flange 186. That is, the heat shield assembly 92 seals two (2) flange interfaces 114, 116. The heat shield assembly 92 thereby provides a double axial lap joint sliding interface with the axial flange 194 of the $6^{th}$ stage OAS flange 186 as well as a circumferential sliding interface between the heat shield segments 130B, 132B (see FIG. 10). A curved end 206, 208 of the respective outer cover plate 140B and the heat shield segments 130B, 132B facilitate axial assembly to the axial flange 194 of the $6^{th}$ stage OAS flange 186.

Figure 11:
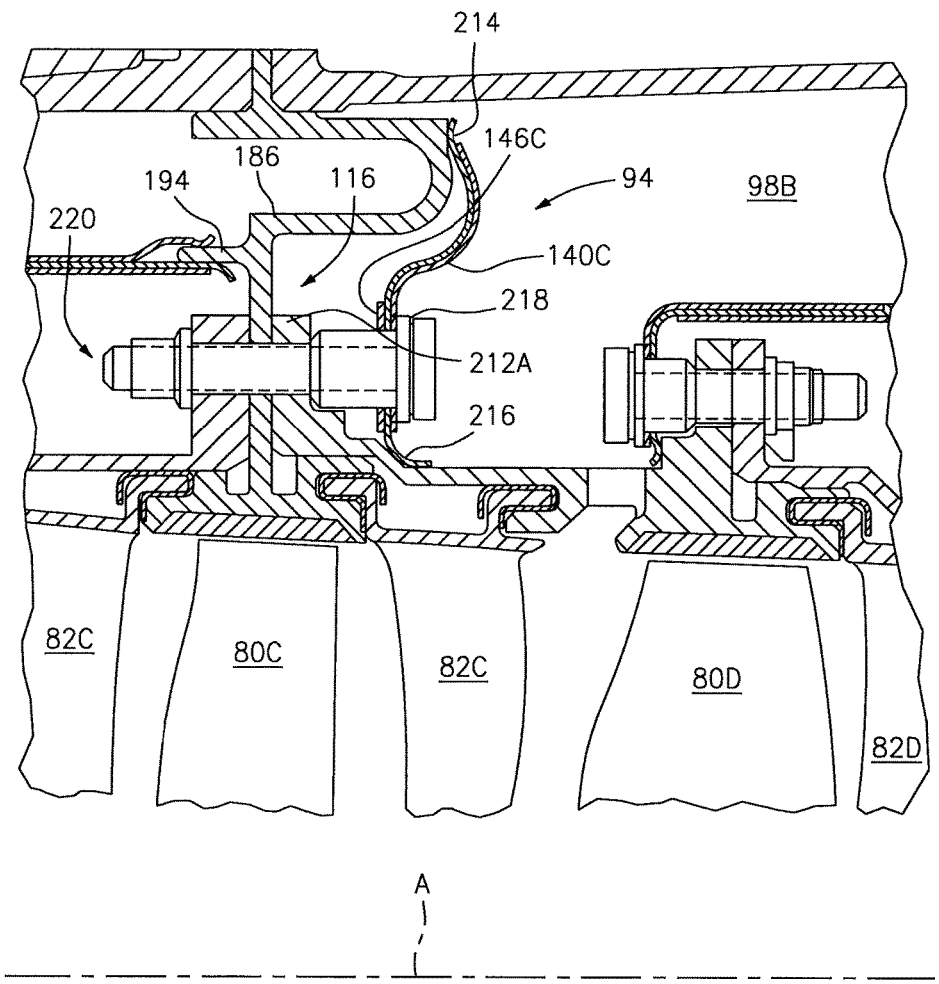
FIG. 11 is a schematic view of a multi-segment heat shield assembly for a $6^{th}$ stage of the High Pressure Compressor Section.
Figure 12:
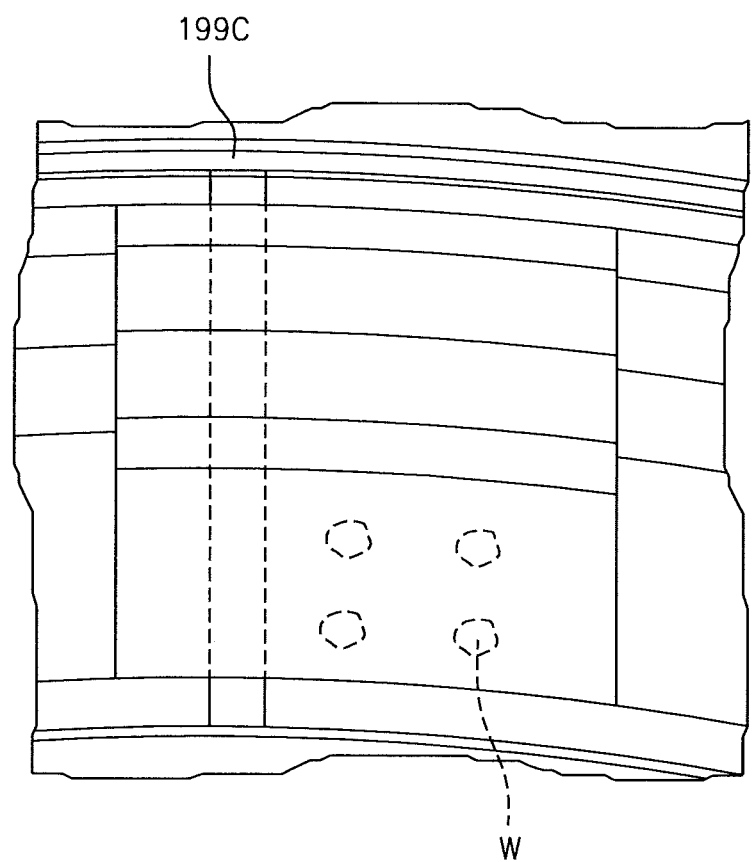
FIG. 12 is a perspective face view of a portion of the multi-segment heat shield assembly for the $6^{th}$ stage of the High Pressure Compressor Section.

With reference to FIG. 11, the heat shield assembly 94 according to another disclosed non-limiting embodiment is generally serpentine shaped to radially seal the outer air seal flange interface 116 between the $6^{th}$ stage OAS flange 186 and a $7^{th}$ stage OAS flange 212A. As afore-described, the heat shield assembly 94 is manufactured of multiple circumferential segments which are sealed by a double circumferential lap joint 144C with an outer cover plate 140C and an alignment tab 146C (see FIGS. 11 and 12).

The heat shield assembly 94 includes curved ends 214, 216 which provide an interference fit with the respective $6^{th}$ stage OAS flange 186 and the $7^{th}$ stage OAS flange 212A to form a pinching preload. Again, a spacer sleeve 218 in the multiple of fastener assemblies 220 (one shown) may be utilized to control the interference fit.

Figure 13:
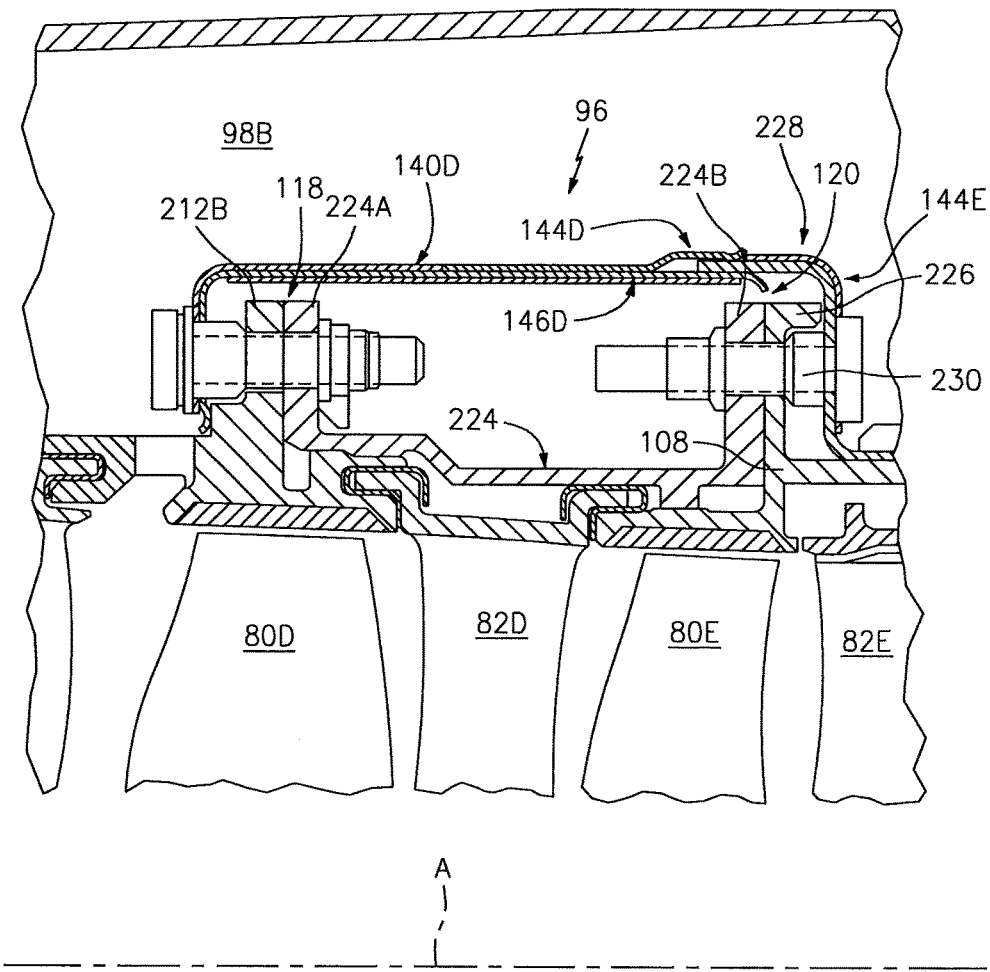
FIG. 13 is a schematic view of a multi-segment heat shield assembly for $7^{th}$-$8^{th}$ stages of the High Pressure Compressor Section.

With reference to FIG. 13, the heat shield assembly 96 according to another disclosed non-limiting embodiment spans the outer air seal flange interface 118 between a $7^{th}$ stage OAS flange 212B and an OAS flange 224A of an OAS spacer case 224 as well as the outer air seal flange interface 120 between an OAS flange 224B of the OAS spacer case 224 and an $8^{th}$ stage OAS flange 226 of the OAS 108. As afore-described, the heat shield assembly 96 is manufactured of multiple circumferential segments which are sealed by the double circumferential lap joint 144D with an outer cover plate 140D and an alignment tab 146D.

The heat shield assembly 96 is generally L-shape similar to the heat shield assembly 92 but interfaces with a heat shield retainer assembly 228 rather than the axial flange 194 of the $6^{th}$ stage OAS flange 186 (see FIG. 9). That is, the heat shield retainer assembly 228 replaces the axial flange 194 of the $6^{th}$ stage OAS flange 186 to provide the interference fit and a pinching preload for the heat shield assembly 96.

Figure 14:
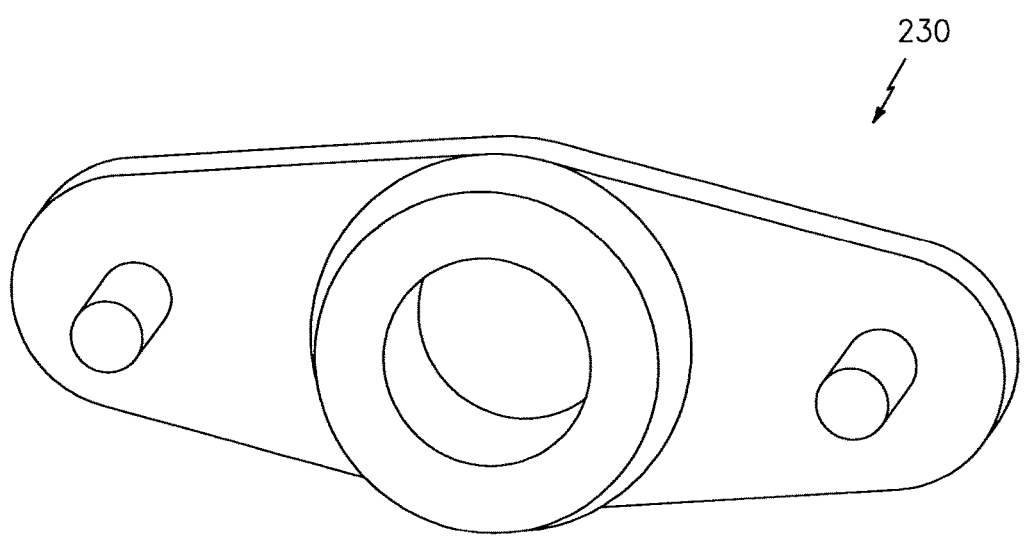
FIG. 14 is a perspective view of a flanged spacer.
Figure 15:
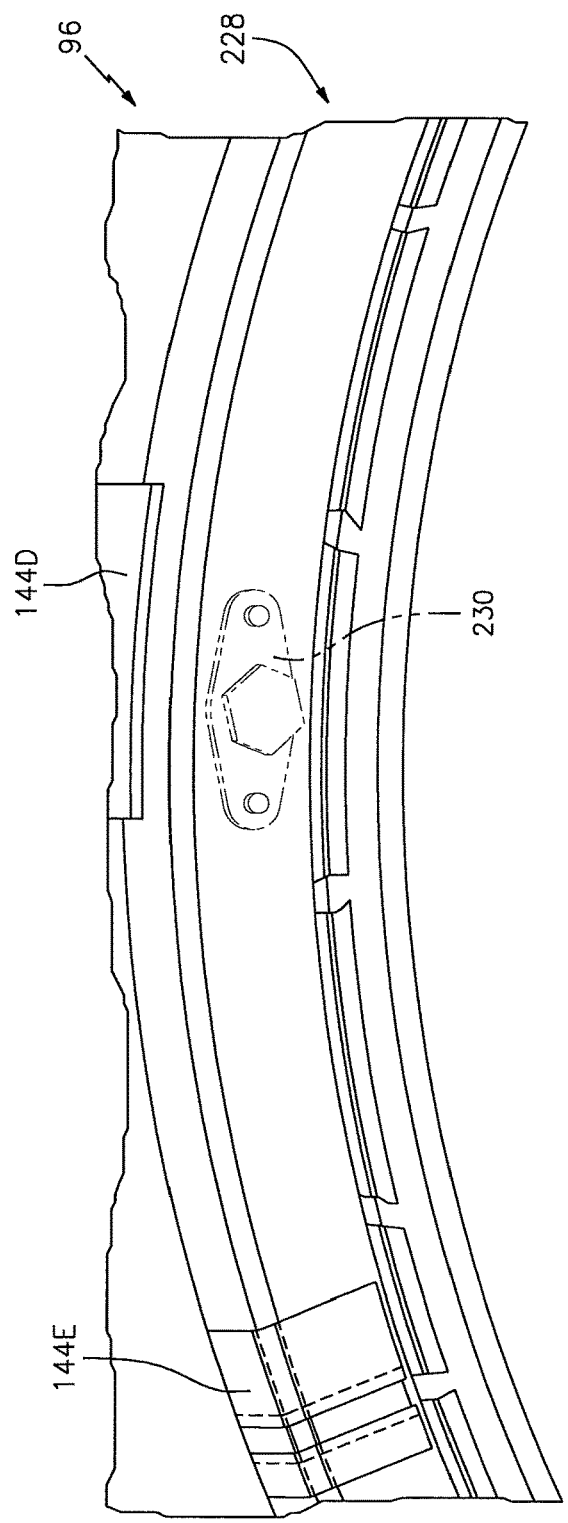
FIG. 15 is an aft looking forward perspective face view of a portion of the multi-segment heat shield assembly for the $7^{th}$-$8^{th}$ stages of the High Pressure Compressor Section.

The heat shield retainer assembly 228 is also manufactured of multiple circumferential segments which are sealed by a double circumferential lap joint 144F. A flanged washer 230 (see FIG. 14) is utilized to axially space the heat shield retainer assembly 228 with respect to the $8^{th}$ stage OAS flange 226 to control the axial sliding interface with the heat shield assembly 96 (see FIG. 15).

The heat shield assemblies 90, 92, 94, 96 effectively seal the circumferential gaps with a double circumferential lap joint 144 that includes the alignment tab 146 to prevent the outer cover 140 from lifting during assembly and operation. The alignment tab 146 forms an additional interference fit seal which increases the sealing efficiency of the outer cover 140.

The heat shield assemblies 90, 92, 94, 96 also provides a sliding double lap joint to allow for axial thermal growth without axial fits—either tight or loose. By removing loose fits, wear on mating parts caused by vibration is reduced. Furthermore, the vibratory modal response of the heat shield assemblies 90, 92, 94, 96 may be designed to be outside of the normal frequency operating range. Also, by removing tight fits, the deformation of legacy designs during assembly is significantly reduced.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A heat shield assembly for a gas turbine engine, the assembly comprising:
   a first heat shield segment defined about an axis;
   a second heat shield segment defined about said axis;
   a double circumferential lap joint between said first heat shield segment and said second heat shield segment;
   wherein said double circumferential lap joint is defined by an outer cover and an alignment tab mounted to said first heat shield segment;
   wherein said outer cover and said alignment tab extend beyond an edge of said first heat shield segment; and
   wherein said alignment tab includes a curved end which curves away from said outer cover.

2. The assembly as recited in claim 1, wherein said outer cover and said alignment tab form an interference fit with said second heat shield segment.

3. The assembly as recited in claim 1, wherein said outer cover includes a radiused end.

4. The assembly as recited in claim 1, wherein said alignment tab is a plate.

5. The assembly as recited in claim 1, wherein said outer cover is generally L-shaped in cross-section.

6. The assembly as recited in claim 5, wherein said outer cover includes an axial end radially displaced from said first heat shield segment.

7. The assembly as recited in claim 6, wherein said axial end includes a curved end that curves away from said first heat shield segment.

8. The assembly as recited in claim 1, wherein said outer cover is generally serpentine shaped.

9. A case assembly for a gas turbine engine, the assembly comprising:
   an outer air seal flange interface defined about an engine axis;
   a first heat shield segment defined about said axis radially outboard of said outer air seal flange interface;
   a second heat shield segment defined about said axis radially outboard of said outer air seal flange interface;
   a double circumferential lap joint between said first heat shield segment and said second heat shield segment;
   a fastener mounted to said outer air seal flange interface and said first heat shield segment;
   wherein said double circumferential lap joint is defined by an outer cover and an alignment tab mounted to said first heat shield segment;
   wherein said outer cover and said alignment tab extend beyond an edge of said first heat shield segment; and
   wherein said alignment tab includes a curved end which curves away from said outer cover.

10. The assembly as recited in claim 9, further comprising a flange which extends from said outer air seal flange interface, wherein said flange is sandwiched between said first heat shield segment, said second heat shield segment and said outer cover.

11. The assembly as recited in claim 10, wherein said first heat shield segment, said second heat shield segment and said outer cover define an interference fit with said flange to generate a pinching preload.

12. The assembly as recited in claim 9, further comprising a heat shield retainer assembly that is mounted to a second outer air seal flange interface; and
    said first heat shield segment, said second heat shield segment and said heat shield retainer assembly surround said outer air seal flange interface and said second outer air seal flange interface.

13. The assembly as recited in claim 9, further comprising a heat shield retainer assembly that is mounted to a second outer air seal flange interface; and
    said first heat shield segment, said second heat shield segment and said heat shield retainer assembly bridge said outer air seal flange interface and said second outer air seal flange interface.

14. A method of mounting a heat shield assembly within a bleed air cavity of a gas turbine engine, the method comprising:
- surrounding an outer air seal flange interface with a first heat shield segment and a second heat shield segment;
- interfacing the first heat shield segment and the second heat shield segment at a double circumferential lap joint to provide a sliding seal;
- wherein said double circumferential lap joint is defined by an outer cover and an alignment tab mounted to said first heat shield segment;
- wherein said outer cover and said alignment tab extend beyond an edge of said first heat shield segment; and
- wherein said alignment tab includes a curved end which curves away from said outer cover.

15. The method as recited in claim 14, further comprising:
- defining a circumferential thermal expansion gap between the first heat shield segment and the second heat shield segment; and
- bridging the circumferential thermal expansion gap with the double circumferential lap joint.

* * * * *